Aug. 15, 1950 M. G. NELSEN ET AL 2,518,810
SELECTIVE VALUE ACTUATED ACCUMULATOR AND CONTROL
Filed March 18, 1949 8 Sheets-Sheet 1

Inventors.
Marvin G. Nelsen
Theodore J. Obszarny
By
Bair & Freeman
Attorneys

Aug. 15, 1950  M. G. NELSEN ET AL  2,518,810
SELECTIVE VALUE ACTUATED ACCUMULATOR AND CONTROL
Filed March 18, 1949  8 Sheets-Sheet 4
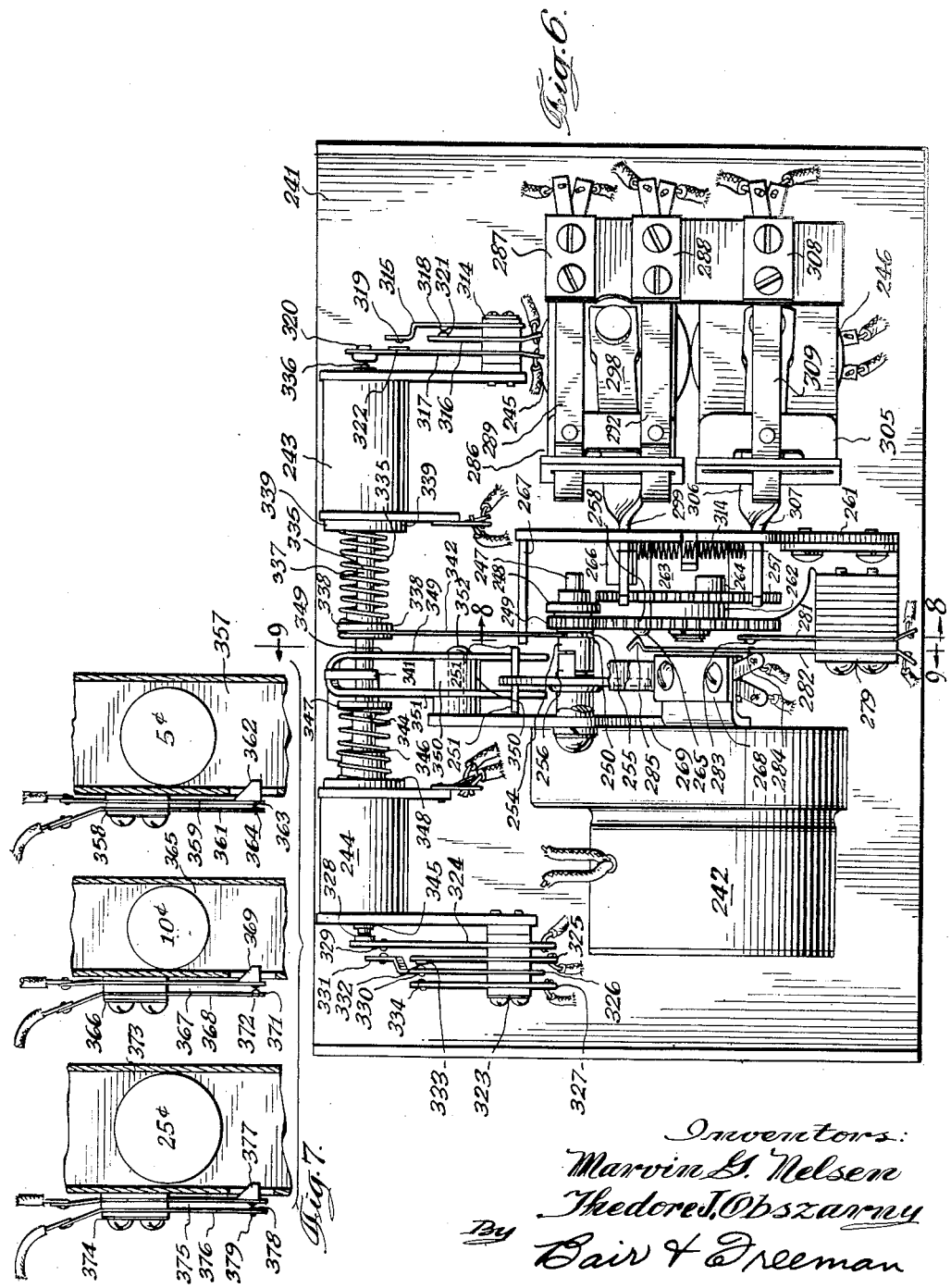

Aug. 15, 1950     M. G. NELSEN ET AL     2,518,810
SELECTIVE VALUE ACTUATED ACCUMULATOR AND CONTROL
Filed March 18, 1949     8 Sheets-Sheet 5

Inventors:
Marvin G. Nelsen
Thedore J. Obszarny
By Bair & Freeman
Attorneys

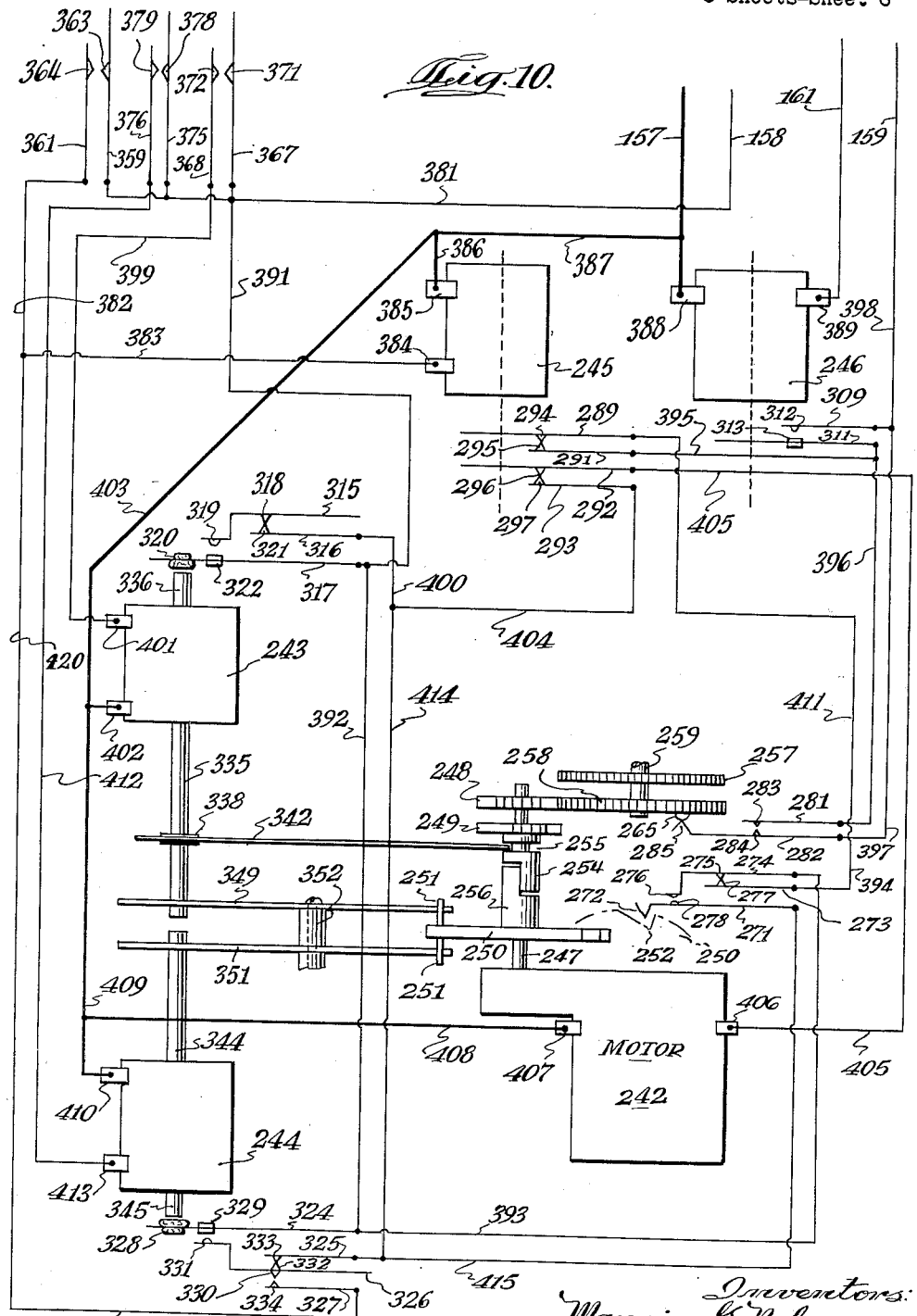

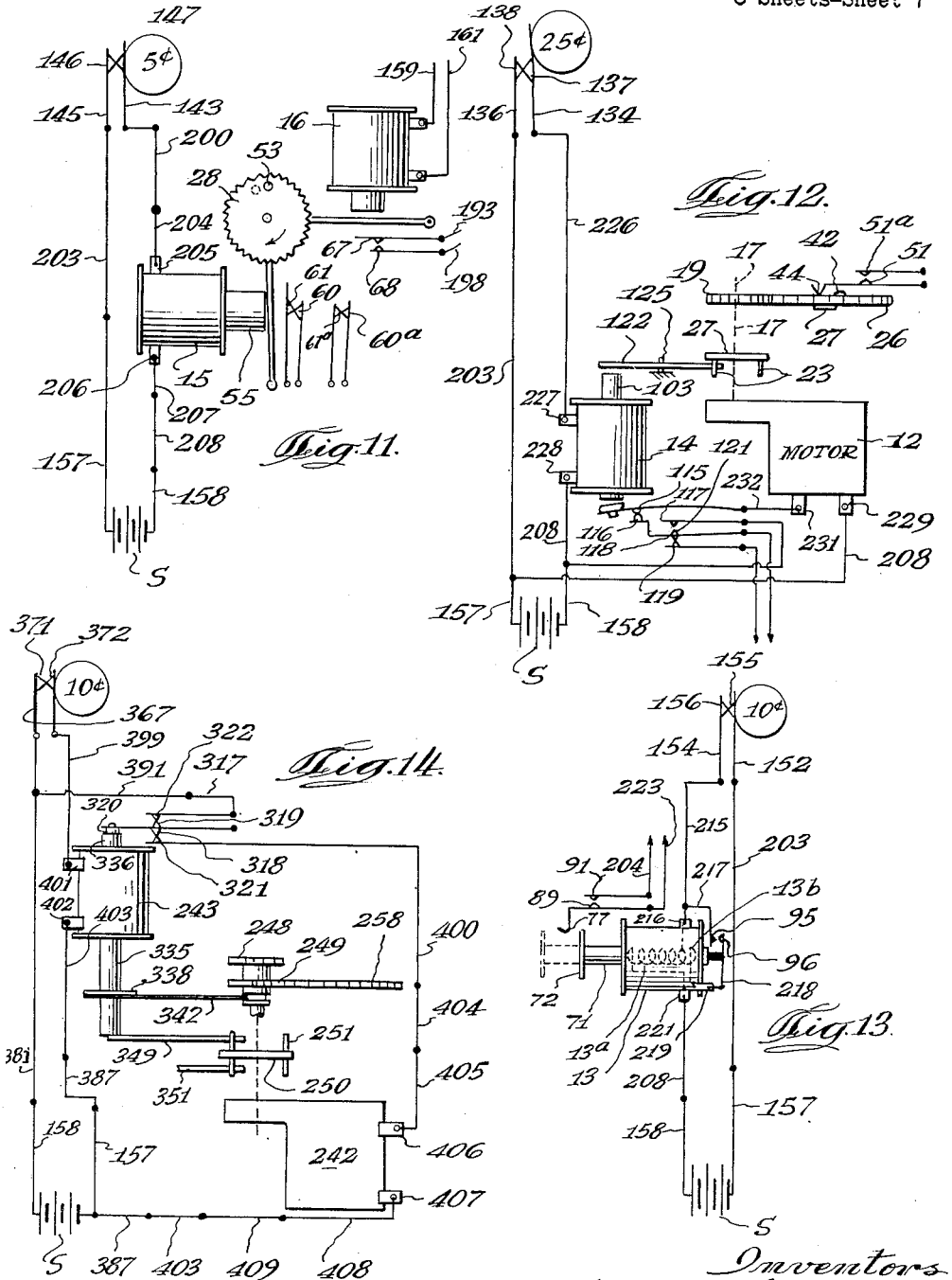

Patented Aug. 15, 1950

2,518,810

UNITED STATES PATENT OFFICE 2,518,810

SELECTIVE VALUE ACTUATED ACCUMULATOR AND CONTROL

Marvin G. Nelsen, Skokie, and Thedore J. Obszarny, Chicago, Ill., assignors to Guardian Electric Manufacturing Co., Chicago, Ill., a corporation of Illinois Application March 18, 1949, Serial No. 82,258

22 Claims. (Cl. 235—92)

This invention relates to accumulators and particularly to accumulators which will add credits when a coin or coins are inserted in a coin chute, or when a particular switch is closed, and will subtract credits as merchandise, services or renditions are dispensed, or other operations occur, or some predetermined time period elapses.

It is an object of the invention to provide improved accumulators.

It is another object of the invention to provide improved accumulators which are at least partially operated by a rotating electrical motor and which add credits very rapidly.

It is a further object of the invention to provide an accumulator which is extremely compact and which is faster in operation than present accumulators.

It is an additional object of the invention to provide an improved arrangement of drive and gears for motor driven accumulators to maintain high torque for the add mechanism and, at the same time, to maintain compactness.

It is a further object of the invention to provide accumulators which are essentially foolproof and jam-proof.

It is also an object of the invention to provide a multi-coin or multi-switch accumulator which is essentially fool-proof, is relatively simple in construction and which is compact.

It is again an object of the invention to provide a multi-coin or multi-switch accumulator which prevents adding of credits or obtaining of the goods, services or result desired if a coin hangs or sticks on one of the coin switches, or if a similar switch remains closed for any reason.

It is an additional object of the invention to prevent accumulator solenoid coils from burning out if a coin hangs or sticks on one of the coin switches, or if a similar switch remains closed for any reason.

It is a further object of the invention to insure that the last credit be usable in an accumulator.

Another object of the invention is to provide an electrical accumulator which prevents making selections of services, goods, or the like while the add mechanism is being operated.

It is also an object of the invention to provide effective anti-jackpotting in an accumulator, that is, to prevent continuous using of or adding of credits if certain switches remain closed when they should normally be open.

While the invention is described with respect to coin operated mechanisms, it will be apparent that any means may be used to close the equivalent of the coin switches and, therefore, that the invention may be applied to other uses, such as business or computing machines.

With these and other objects in view, the invention consists in the construction, arrangement and combination of the various parts of our device whereby the objects contemplated are attained, as hereinafter more fully set forth, pointed out in the claims, and illustrated in the accompanying drawings, wherein:

Figure 6 is a top plan view of the mechanism constructed in accordance with a second embodiment of the invention.

Figure 7 is a diagrammatic view of the 5, 10 and 25 cent coin chutes used with the invention.

Figure 10 is a diagrammatic wiring diagram utilized with the mechanism shown in Figure 6.

Figure 11 is a partial wiring diagram illustrating the operation when a nickel is utilized in the mechanism shown in Figure 1 or 6.

Figure 12 is a wiring diagram showing the circuit established when a quarter is used in the mechanisms of Figures 1 and 6.

Figure 13 is a wiring diagram showing the circuits energized when a dime is utilized in the mechanism shown in Figure 1.

Figure 14 is a wiring diagram showing the circuits energized when a dime is utilized in the mechanism shown in Figure 6.

*Description of Figures 1 to 6 inclusive and 15*

Referring specifically to Figures 1 to 6 inclusive and 15, for a detailed description of the first embodiment of the invention, 11 designates generally a base plate upon which the coin changing mechanism is mounted, a cover (not shown) being provided for the mechanism.

While the description of the invention is on the assumption that nickels, dimes and quarters are used, it is obvious that coins of any denomination which are a multiple of any chosen unit may be utilized. Furthermore, the invention is not limited to coin operated apparatus as credits may be accumulated and subtracted by the operation of certain switches by any manual means, such as in a business machine.

Figure 1:
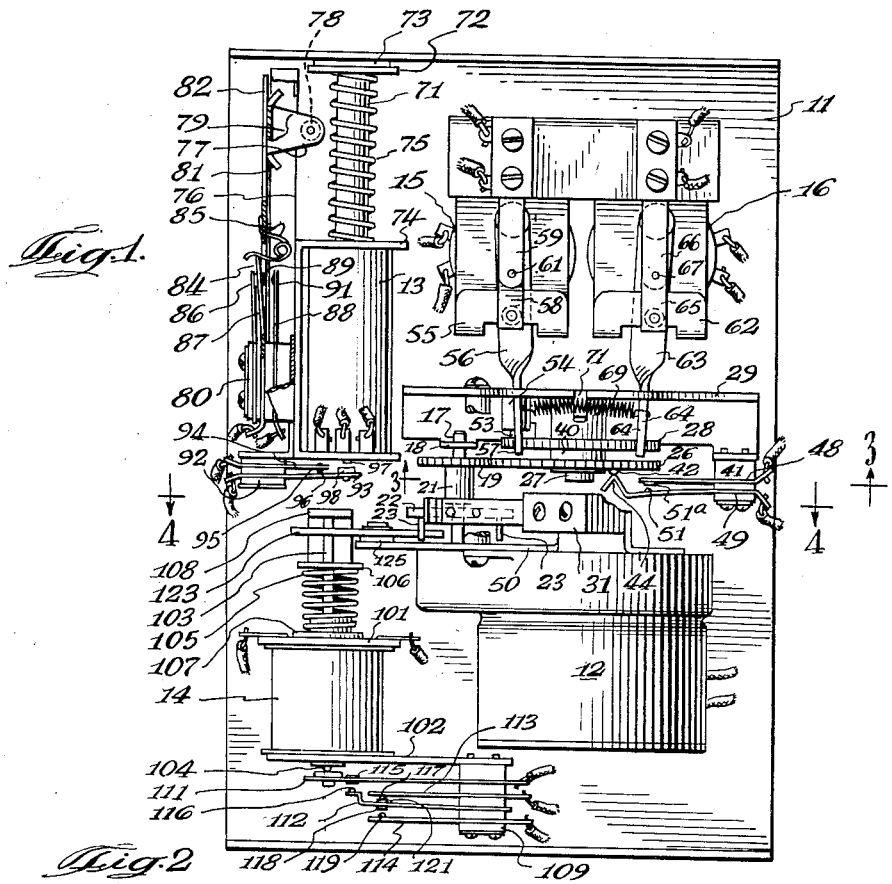
Figure 1 is a top plan view of the mechanism constructed in accordance with one embodiment of the invention.
Figure 5:
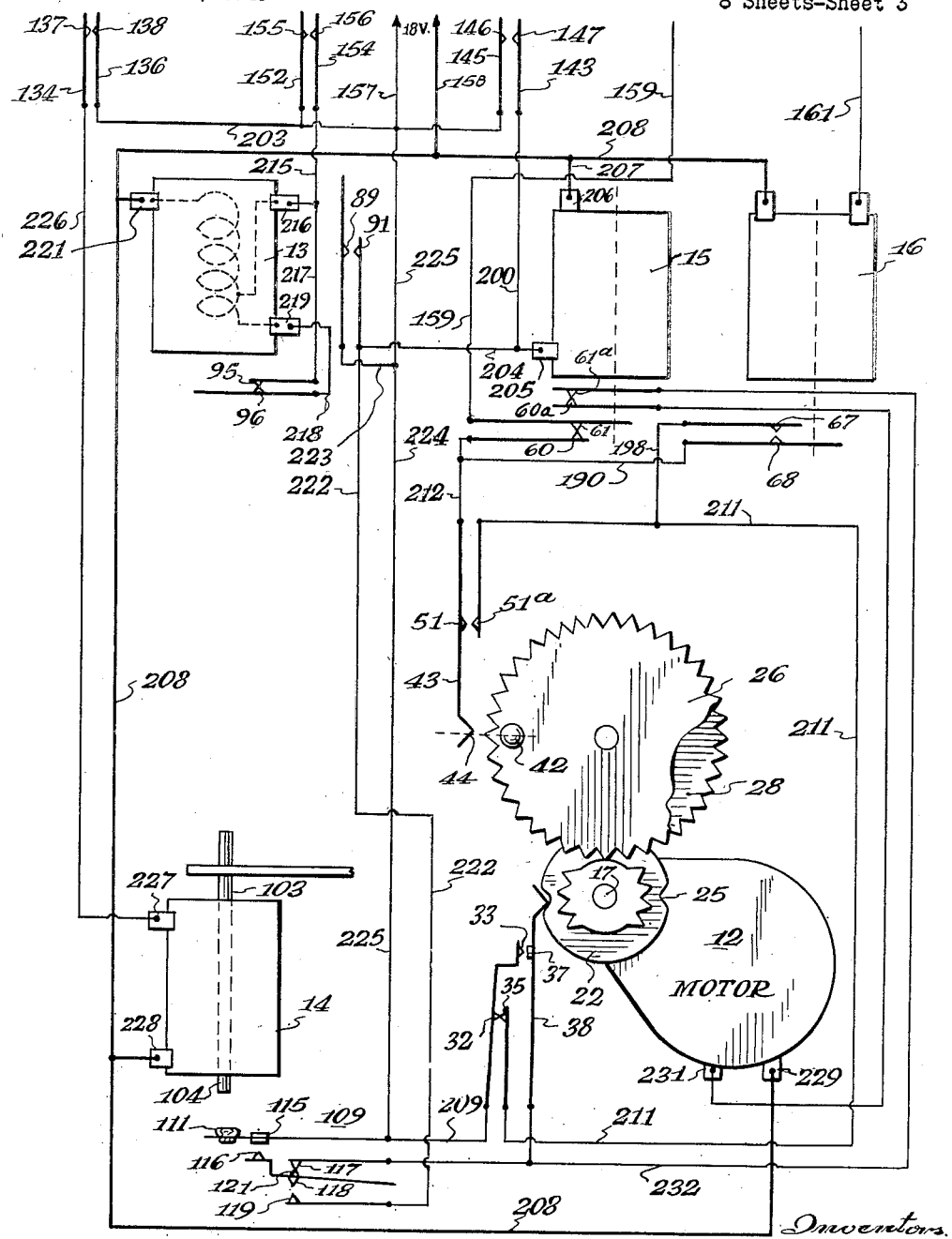
Figure 5 is a diagrammatic wiring diagram utilized in connection with the mechanism shown in Figure 1.

As best shown in Figures 1 and 5, a motor 12 is mounted on the base 11 and dime and quarter solenoids 13 and 14 respectively are also mounted on the base 11, preferably in a horizontal position. An add solenoid, sometimes referred to as the nickel solenoid, is shown at 15 and is preferably mounted vertically on the base 11. A subtract solenoid 16 is mounted beside the add solenoid 15 and also is preferably disposed vertically on the base 11.

A motor 12 is provided with a shaft 17 which is driven through suitable gearing (not shown) and the outer end of the shaft 17 is supported by a lug 18 mounted on the base 11.

Figure 3:
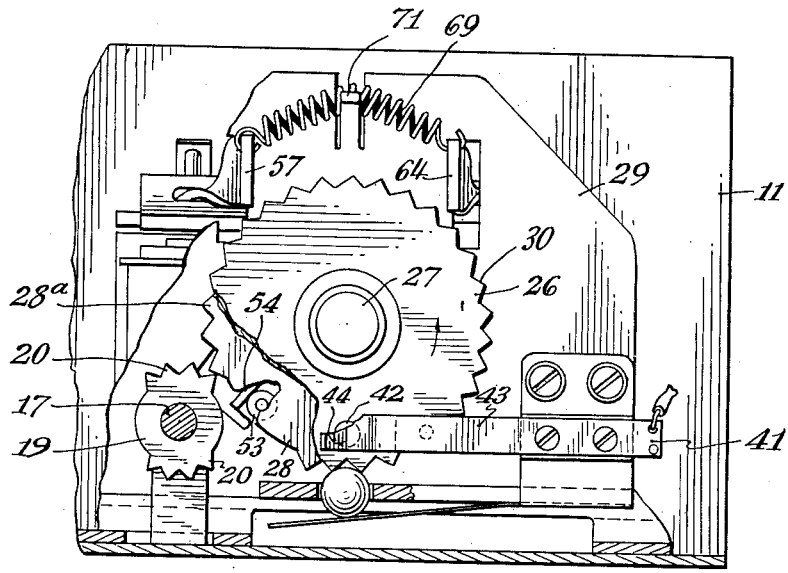
Figure 3 is a sectional view, with parts thereof broken away, taken on line 3—3 of Figure 1.

The shaft 17 rotates a gear 19 which is best shown in Figure 3 and it will be noted that the gear has two sets of four oppositely spaced teeth 20, with smooth portions therebetween. A collar 21 is provided on the shaft 17 to properly space the gear 19. The shaft 17 also drives a cam member 22 having two oppositely disposed depressions 25 in its surface, the remainder of the surface, shown at 24, being smooth. The cam is also provided with a pair of horizontally projecting pins 23, for a purpose hereinafter described.

The gear 19, when rotated, is adapted to have its teeth 20 engage with teeth 30 of a gear 26 mounted on a shaft 27, which is supported in a vertical supporting member 29 secured to the base 11. The motor 12 is so controlled that gear 19 always stops with a flat portion facing the gear 26 and out of engagement therewith. A second gear 28 is also rotatably carried on the shaft 27 and is provided with teeth 28a. A common ball detent engages with the teeth 30 of gear 26 to retain the gears 26 and 28 in any position in which they are set. The gears 26 and 28 are rigidly connected together by a collar 40.

A switch generally indicated at 31 is mounted on a supporting member 50 which is secured to the base 11. The switch 31 includes a contact 32 and a contact 33 mounted in spaced apart relation on a movable resilient switch arm 34. A contact 35, which is adapted to engage with contact 32, is mounted on a relatively fixed resilient arm 36. A contact 37 adapted to engage with contact 33 is mounted on a movable resilient arm 38. At the end of the arm 38 is a V-shaped portion 39, which is adapted to either ride on the surface 24 of the cam 22, or to drop into the depressions 25 thereof, depending upon its position.

Another switch 41 is mounted on the base 11 and includes a movable arm 43 having a V-shaped end 44 thereon. A projection 42 is provided on the side of the gear 26 facing the switch 41 and when the projection 42 engages with the V-shaped portion 44 of the switch arm 43, the switch arm 43 is moved downwardly as viewed in Figure 1. The selector switch 41 also includes a switch arm 45. The movable switch arm 44 has a contact 51 thereon which is adapted to engage with a contact 51a mounted on the switch arm 45.

The add or five cent solenoid 15 includes an armature 55 which is preferably mounted at the top of the solenoid 15. An arm 56 extends horizontally from the armature 55 and terminates in a blade 57 which is adapted to engage with the teeth 28a on the gear 28. It is obvious, therefore, that as the armature 55 is attracted and returned to its upper position by means of a spring 69, that each operation will move the gear 28 the equivalent distance of one tooth. The gear 26 may be rotated because the teeth 20 are out of engagement therewith at times when the add solenoid is operating.

The solenoid 15 also has a switch mounted on the top thereof which includes a movable switch arm 58 and a relatively fixed switch arm 59. The movable switch arm 58 has a contact 60 thereon which is adapted to engage with a contact 61 on the relatively fixed arm 59.

The subtract or cancel solenoid 16 is also provided with an armature 62 and is constructed in all respects identically with the add solenoid 15. A horizontally extending arm 63 is secured to the armature 62 and terminates in a blade 64 which is adapted to engage the teeth 28a of the gear 28 on an opposite side of the center of rotation thereof from the blade 57. The spring 69 is positioned over a projection 71 on member 29 and tends to retain both the blades 57 and 64 and the armatures 55 and 62 in their upward position. It will be obvious that each time the subtract solenoid 16 operates that the gear 28, as well as gear 26, will be moved a distance equal to the space of one tooth 28a.

The gear 28 is provided with a projection 53 which is on the side thereof facing the vertical plates 29. A tab 54 is bent inwardly from the plate 29 and cooperates with the projection 53 to provide a stop for the gear 28 for preventing further rotation of gear 28 when credits corresponding to the number of teeth on gear 28 have been credited.

A switch is mounted on the top of the subtract solenoid 16 and includes a movable switch arm 65 which is operated by the armature 62 and a relatively fixed switch arm 66. A contact 67 is provided on the relatively fixed switch arm and is adapted to engage with a contact 68 on the movable switch arm 65.

If desired, another set of contacts 60a and 61a may be provided on the add solenoid 15 for a purpose to be described. While the contacts 60a and 61a are not shown in Figure 1 of the drawings, they are shown diagrammatically in Figures 5 and 11.

Referring now to the ten cent solenoid 13, it includes a long armature 71 having a metal washer 72 at its outer end. A felt pad 73 is preferably secured to the end of the frame 11 to absorb the shock of the washer 72 striking thereagainst. A frame member 74 supports the solenoid 13 and a spring 75 is disposed between the washer 72 and the end of the frame member 74, whereby the armature 71 is normally retained in its extended position as shown in Figure 1.

A switch generally indicated by the numeral 76 is associated with the solenoid 13 and is adapted to be operated thereby. The switch 76 includes a rotatable switch operating member 77 having a roller 78 with which the washer 72 is adapted to engage. The switch operating member 77 is pivoted at 79 to the body portion of the switch and is provided with a pair of outwardly extending ears 81. A flexible blade 82 is rigidly secured at one end thereof to an insulating switch body 80 and is adapted to be engaged by the rotatable switch operating member 77 at its free end, since the free end overlies the member 77. The flexible switch member 87 is also secured to the insulated body of the switch 80 and has a free end 84 to which is connected a hairpin spring 85. The spring 85 also connects with the free end of the flexible arm 82, so that a snap acting movement is imparted to the free end of the switch arm 87, in a manner well understood in the art. The movable switch arm 87 is provided with a contact 89 which is adapted to engage with a contact 91 on a relatively fixed switch arm 88, which is also secured to the body 80 of the switch. It will be clear, therefore, that as the washer 72 rotates the member 77 on its inward stroke, contacts 89 and 91 will be engaged momentarily and, as the washer 72 rotates the member 77 on its outer stroke, the contacts 89 and 91 will again be momentarily engaged.

A second switch 92 is adapted to be operated by the ten cent solenoid 13 and is disposed at the end thereof opposite the washer 72. The switch comprises a movable switch arm 93 and a fixed flexible switch arm 94. The fixed switch arm 94 has a contact 95 provided thereon which is adapted to engage with a contact 96 on the movable switch arm 93. A pin 97 is adapted to be forced outwardly when the armature 71 is at the extreme attracted position. The pin 97 engages a buttton 98 to momentarily move the switch arm 93 to open contacts 95 and 96. As soon as the armature 71 begins to return to the unattracted position, the pin 97 retracts and the contacts 95 and 96 are again closed.

Referring now to the twenty five cent solenoid 14, it is to be noted that it is mounted between two frame members 101 and 102 which are secured to the base 11. Preferably the frame members 101 and 102 are made in one piece.

The solenoid 14 has an armature 103 therein which extends a considerable distance from one side of the solenoid and has an extension 104 protruding slightly from the other end of the solenoid. A spring 105 is disposed between a washer 106 and a collar 107, the latter being secured to the frame 101 to retain the armature 103 normally in the extended position, shown in Figure 1, with the portion 104 in the retracted position. A member 108 secured to the base 11 provides a stop for the outward movement of the armature 103.

A switch generally indicated at 109 is adapted to be operated by the protruding portion 104 of armature 103. The switch 109 includes two flexible movable arms 111 and 112 and two relatively fixed flexible arms 113 and 114. A contact 115 is provided on arm 111 and is adapted to engage with a contact 116 on arm 112. Arm 113 is provided with a contact 117 which is adapted to engage with a contact 121 on arm 112. Arm 112 is also provided with a contact 118 which is adapted to engage with a contact 119 on arm 114.

Figure 4:
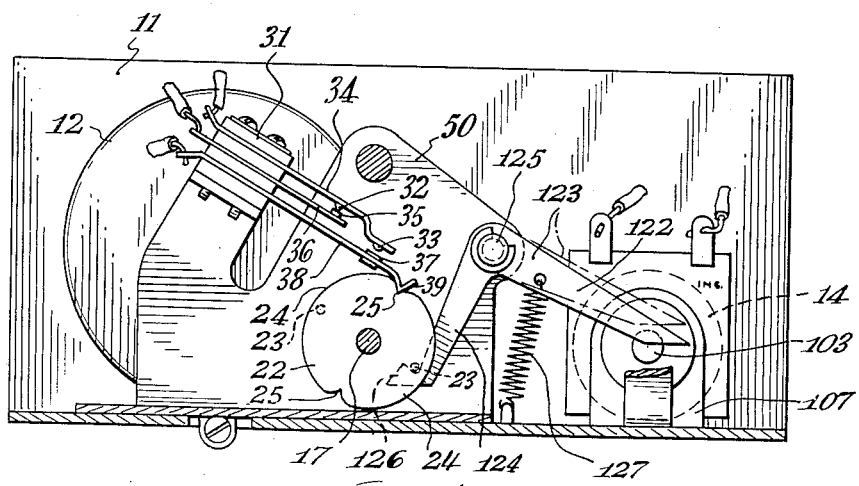
Figure 4 is a sectional view of the apparatus, taken on line 4—4 of Figure 1.

As best shown in Figures 1 and 4, a latch in the form of a bell crank lever is generally indicated by the numeral 122 and has two angularly extending arms 123 and 124. The lever 122 is pivoted at 125 at the bisection of the arms 123 and 124. A latching hook 126 is provided at the extremity of the arm 124 and is adapted to be engaged by the pins 23 on cam 22. The end of the arm 123 is disposed in such a position by a spring 127 so that it normally rests in contact with the upper surface of the armature 103 of solenoid 14. However, when the armature 103 is retracted, the spring 127 pulls the arm 123 downwardly and when the armature 103 is released, it will stop short of the stop member 108 because the end of the arm 123 will block its complete return. The bell crank lever 122 will stay in such position with the armature 103 blocked until one of the pins 23 is rotated by the motor 12 rotating cam 22 one half a revolution to engage the portion 126 of the bell crank lever 122 and raise the end of the arm 123. The spring 105 will then force the armature 103 against the stop member 108.

As will be more completely described, the extension 104 of the armature 103 will make and break certain contacts of switch 109 when the armature is in its completely retracted position, and will make and break certain contacts of the switch member 109 when it is in its partially retracted position because of being blocked by the latch 122.

Figure 2:
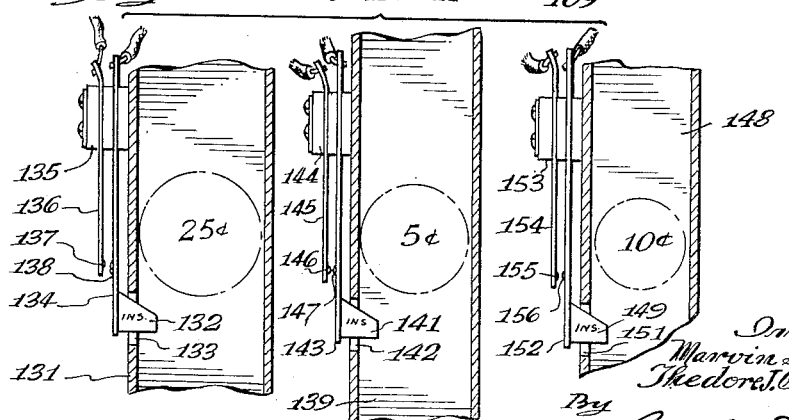
Figure 2 is a diagrammatic showing of 5, 10 and 25 cent coin switches utilized in practicing the invention.

Referring specifically to Figure 2 for a description of the coin chutes and switches, the twenty-five cent coin chute is designated at 131. A projection 132 extends into the coin chute 131 through an aperture 133 in the side thereof and connects with a movable flexible switch arm 134 of a twenty-five cent coin switch 135. The coin switch 135 also includes a relatively fixed flexible arm 136 which has a contact 137 thereon adapted to engage with a contact 138 when a twenty-five cent piece is inserted in the chute and contacts the projection 132. It is to be understood that the description and drawings of the coin switches are merely diagrammatic and that a standard coin switch and slug ejector is normally utilized.

Referring to the five cent coin switch, the chute is shown at 139. A projection 141 extends into the chute through an aperture 142 in the side thereof and is connected to a movable switch arm 143 of a five cent switch 144. The switch 144 also includes a fixed flexible arm 145 having a contact 146 thereon adapted to engage with a contact 147 on the movable switch arm 143. When a nickel is inserted in the chute 139 it will engage the projection 141 momentarily and close contacts 146 and 147 for a short period of time.

The ten cent chute is shown at 148. A projection 149 extends through an aperture 151 in the side of the chute 148 and is connected to a movable flexible switch arm 152 of a ten cent switch 153. The switch 153 also includes an arm 154 having a contact 155 thereon adapted to engage with a contact 156 on the movable switch arm 152. When a ten cent piece is inserted in the chute 148, it will move the projection 149 and momentarily close contacts 155 and 156.

Figure 15:
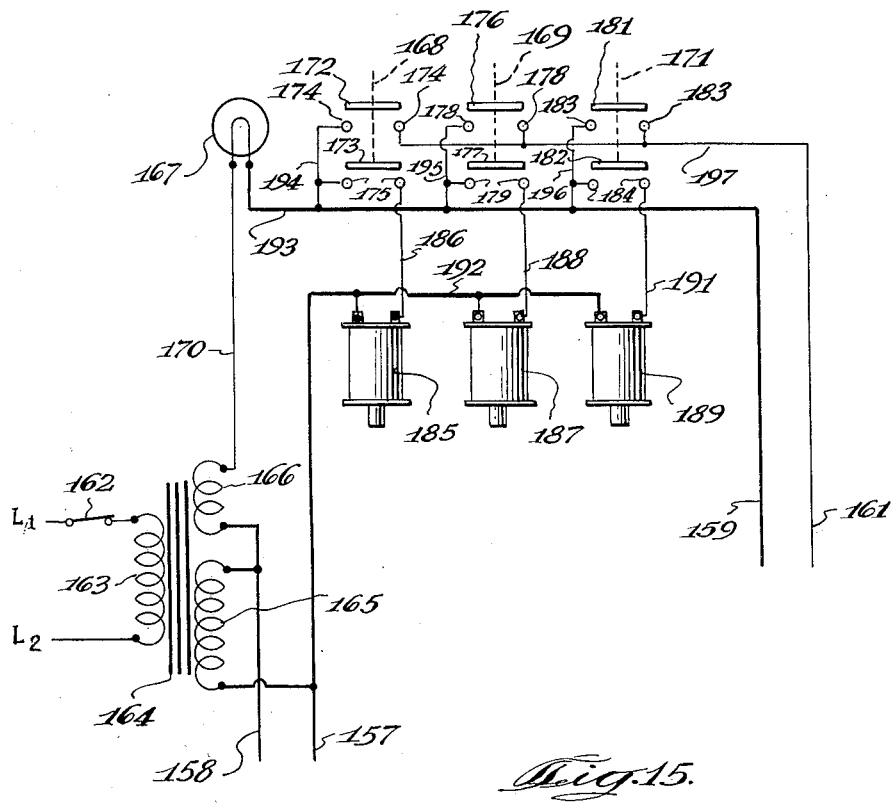
Figure 15 is a diagrammatic wiring diagram of a simplified phonograph control which may be connected to both the mechanisms shown in Figures 1 and 6.

Referring now to Figures 5, 11, 12, 13 and 15 for a detailed description of the circuits for the above mechanism. The incoming power lines for the mechanism are shown at 157 and 158 in Figure 5. These lines are connected to the circuits shown in Figure 15, which is a diagrammatic drawing of a typical phonograph selection circuit used with pay phonographs. This circuit is illustrated merely by way of example in order to make the description of the invention complete and forms no part of the present invention. Another set of leads 159 and 161 are connected to the circuit, as shown in Figures 5 and 15. The purpose of these leads will be clear as the description progresses.

The phonograph selection circuit includes a 110 volt A. C. line shown at L—1, L—2 having a line switch 162 therein. The lines L—1 and L—2 are connected with the primary of a transformer 164 which primary is shown at 163. Two secondary coils 165 and 166 are provided, the larger coil supplying energy to the power lines 157 and 158, the voltage being for example, 18 volts. The smaller secondary 166 supplies 6 volt power to the phonograph light circuit. An incandescent lamp 167 is connected by a line from the output of the secondary coil 166 by a conductor 170, which light is illuminated at the time when selections may be made. The light is also connected through a conductor 193 to the lead 159 and the lamp 167 will be illuminated and line 193 will have power therein whenever master switch contacts 51, 51a and contacts 60 and 61 associated with the five cent relay 15 are closed. The circuit from the line 159 is shown in Figure 5 and comprises the contact 60, 61 conductor 212, closed contacts 51, 51a, conductor 211 normally closed contacts 32, 35 of the cam operated switch 31 and conductors 209 and 225 back to lead 158, which is connected to the opposite side of the secondary 165 of the transformer 164.

The phonograph selection circuit is shown with only three selector buttons and solenoids, but it is obvious that any number of these may be in the circuit. The selector button switches are shown generally at 168, 169 and 171. The respective solenoids controlled by these switches are shown at 185, 187 and 189.

The solenoid 168 includes two bridging contacts 172 and 173 which are suitably connected together and which are adapted to bridge fixed contacts 174 and 175 respectively, whenever a selection is made by moving the movable contacts 172 and 173.

The selection switch 169 is identical with switch 168 and includes movable bridging contacts 176 and 177 adapted to bridge contacts 178 and 179 respectively.

The selection switch 171 is also identical and includes bridging contacts 181 and 182 adapted to bridge contacts 183 and 184 respectively.

Solenoid 185 is connected to contact 175 by a conductor 186, solenoid 187 is connected to contact 179 by conductor 188 and solenoid 189 is connected to contact 184 by a conductor 191. A common conductor 192 from power line 157 connects the three contacts 185, 187 and 189, so that a circuit may be completed therethrough.

A conductor 194 connects contacts 174 and 175 of switch 168 to line 193. A conductor 195 likewise connects contacts 178 and 179 of switch 169 to line 193. A similar conductor 196 connects contacts 183 and 184 to line 193.

A common lead 197 connects contacts 174, 178 and 183 of the three coin selection switches to conductor 161 which, it will be noted by reference to Figure 5, is connected to one side of the cancel solenoid 16. The other side of the cancel solenoid 16 is connected to power line 157, so that each time one of the selector switches is operated the cancel solenoid will be energized to cancel one credit by rotation of gear 28. The circuit will be completed from conductor 159, conductor 193, through the lower closed contacts of whatever selector switch has been closed, through one of the conductors 194, 195 or 196, through upper closed contacts of the same selector switch, and through conductor 161 to the cancel coil which is connected to the line 157 through conductor 208 to energize the same.

*Operation of Figures 1 to 5, 11, 12, 13 and 15*

Referring to the operation of Figures 1 to 5, 11, 12, 13 and 15, the sequence of operations will first be described when a nickel is placed in the machine. As best shown in Figures 5 and 11, power from a source marked "S" in Figure 11 enters the circuit through the lines 157 and 159. When contacts 146 and 147 are closed by passage of a nickel through the chute 139, a circuit is established from line 157 through conductor 203, momentarily closed contacts 146, 147, conductors 143, 200 and 204 to a terminal 205 of the add solenoid 15, thence through terminal 206 of the add solenoid thence through conductors 207 and 208 back to line 158 thus completing the circuit and energizing the solenoid 15. Energization of the solenoid 15 attracts armature 55 and rotates the gear wheels 26 and 28 the distance of one notch. The rotation of the gear wheel 26 moves the projection 42 away from the V-shaped portion 44 of switch arm 43, thus closing master switch contacts 51, 51a. This supplies power to the phonograph selector circuit shown in Figure 15 as described above. When one selection is made, the cancel solenoid 16 is operated, the gears 26 and 28 are turned in the opposite direction and the master switch contacts 51, 51a are again opened so that no further selections may be made.

The contacts 60, 61, 60a and 61a are normally closed, but are opened at the time the add solenoid 15 is energized. Opening of the contacts 60a, 61a merely prevents the motor 12 from being energized at the same time the add solenoid 15 is energized to prevent jamming of the mechanism at this time. The opening of contacts 60, 61 prevents making selections at the moment that the add solenoid 15 is being operated so that adding a credit and cancelling a credit cannot be effected at the same time. If the solenoids 15 and 16 were permitted to operate at the same time, the gears 26 and 28 would not move.

Furthermore, if a nickel sticks or for any reason contacts 146, 147 remain closed, gears 26 and 28 would be prevented from rotating by blade 57 and selector contacts 51, 51a would remain closed. However, no selections may be made because contacts 60, 61 would remain open.

The contacts 67, 68 operated by the subtract solenoid 16 also momentarily close when a selection is made and these contacts are connected in parallel with the phonograph selector master switch having contacts 51, 51a, to insure, on the last credit, that the circuit to the selector mechanism is maintained in energized condition so that the mechanism may complete a selection. In case of a sluggish solenoid or slowness in operation of other mechanism, the closing of contacts 67, 68 momentarily will always insure that the last credit is usable.

As stated, if a nickel sticks on the nickel coin switch and holds contacts 146, 147 closed, contacts 60, 61 on the add solenoid 15 will remain open so that no selection may be made regardless of what coins might be utilized. Furthermore, contacts 60a and 61a operated by solenoid 15 will also be open so that it will be impossible to energize the motor 22, whereby a quarter cannot establish credits on the machine. As will be explained hereinafter, a quarter must operate motor 12 in this embodiment of the invention in order to establish credits. Also, a dime will not add credits because, as will be explained, the add solenoid 15 must be energized twice in succession when a dime is used, but it already would be energized and cannot be de-energized until the nickel coin switch 144 is cleared.

The operation of the system when a dime is inserted in the dime chute 148 is best shown in Figures 5 and 13. A dime closes coin switch contacts 155 and 156 momentarily. The closing of these contacts establishes a circuit starting from the source of power marked "S" in Figure 13 through line 157 which, as stated above, is connected to one side of the transformer 164, thence through conductor 203 to conductor 152 through closed contacts 155, 156 through conductors 154 and 215 to terminal 216 on the ten cent solenoid 13 thence through terminal 221, conductor 208 and back to line 158 which is connected to the other side of the transformer 164. It is to be noted that the ten cent solenoid 13 has two coils therein, one of greater resistance shown at 13a, for example, of 35 ohms, and one of less resistance, shown at 13b for example of 7 ohms. Since contacts 95 and 96 associated with the ten cent solenoid 13 are normally closed, the two coils 13a and 13b are normally connected to line 157, 158 so that both are energized when the ten cent coin switch contacts 155, 156 are closed. The coil 13b receives its energy through conductors 215, 217, 218 and terminal 219 of solenoid 13, the terminal 221 being a common terminal for both the coils 13a and 13b.

As will be apparent from the description of the ten cent solenoid 13 and, as shown in Figure 1, when the ten cent solenoid is at its limit in attracted position, the contacts 95 and 96 are opened. If the dime does not stick and hold contacts 155, 156 closed, both coils 13a and 13b are de-energized after having been energized, contacts 95 and 96 close and the armature 71 of solenoid 13 returns to the position shown in Figure 1. If, however, a coin sticks and holds contacts 155 and 156 closed, the sequence will be that both coils 13a and 13b will be energized and the armature 71 will move to its fully attracted position, thus opening contacts 95 and 96. Contacts 95 and 96 will cut out coil 13b of less resistance but coil 13a of greater resistance will remain energized and will hold the armature 71 in the fully attracted position. The purpose of cutting out the coil 13b of low resistance in case of a coin sticking and maintaining contacts 155, 156 closed, is to prevent burning up of the solenoid 13.

Upon energization of the solenoid 13 in the manner just described and the moving of the armature 71 to its attracted position, the washer 72 secured to the end of the armature 71 will strike the roller 78 of switch 80 and rotate the pivoted member 77 about the pivot 79, thus raising the flexible arm 82. Raising of the arm 82 will snap the arm 84 to the opposite position to that shown in Figure 1, so that contacts 89 and 91 will be momentarily closed. As the washer 72 dis-engages from the roller 78 in the movement of the armature to its fully attracted position, the flexible arm 82 will again assume a flat position and the arm 84 will snap to the position shown in Figure 1 and open contacts 89 and 91. As soon as the solenoid 13 is de-energized by the ten cent piece passing through the coin chute and the opening of contacts 155, 156 on the coin switch, the armature 71 will be returned to the position shown in Figure 1 by the spring 75. As the washer 72 again engages and disengages from the roller 78 of pivoted member 77, the same sequence of operations as just described will occur and contacts 89, 91 will again be closed and then opened. Each time the contacts 89, 91 are closed and opened, the add solenoid 15 will be energized. Since the contacts 89, 91 are opened and closed twice each time a dime closes contacts 155, 156 of the coin switch, two impulses will be conveyed to the add solenoid 15 so that, as explained above, the armature 55 of solenoid 15 will be moved twice and gear wheels 26 and 28 will be moved a distance equivalent to two notches. When the contacts 89 and 91 are closed, a circuit is established to energize the add solenoid 15, starting with line 157, which is connected to one side of the transformer 164, thence through conductors 225 and 223, through closed contacts 89, 91, through conductor 204 and terminal 205, through the add solenoid 15 to terminal 206, thence through conductors 207 and 208 back to lead 158, which is connected to the other side of the transformer 164.

As explained above, when the gear wheels 26 and 28 are rotated, the master switch contacts 51, 51a are closed and, if only ten cents is inserted in the mechanism, two selections may be made before the button 42 will again engage the portion 44 of switch arm 43 of the master switch, to again open contacts 51, 51a and prevent any further selections from being made. It is obvious that as many dimes as desired within the limit of the number of notches on gears 26 and 28 may be inserted and the same thing is true of nickels or quarters. When the limit of the notches on the gears 26 and 28 is reached for adding credits to the mechanism, the stop 53 on gear 28 will engage with the tab 54 on frame number 29, and no additional credits may be added.

Referring now to the operation of the mechanism, when a quarter is utilized, which operation is best shown in Figures 1, 5 and 12, the quarter in its passage through chute 131 momentarily closes contacts 137, 138 to first energize the quarter solenoid 14. A circuit is established to energize the quarter solenoid 14 from the source of power, again marked "S" in Figure 12, starting at line 157, which is connected to one side of transformer 164, thence through conductors 203 and 136, through contacts 137, 138 of the quarter switch, thence through conductors 134 and 226 to terminal 227 of the quarter solenoid 14, through the quarter solenoid 14 to terminal 228 thereon, thence through conductor 208 back to lead 158, which is connected to the other side of the transformer 164. When the quarter solenoid is thus energized, the armature 103 is moved to its attracted position and, as shown in Figure 4, spring 127 rotates the bell crank lever 122 to a position wherein the arm 123 thereof blocks the armature 103 and prevents spring 105 from returning it to its unattracted position, shown in Figure 1. At the same time the latching projection 126 of arm 124 of the bell crank lever 122 is moved to the left, as viewed in Figure 4.

The first credit is made when a quarter is used by the add solenoid 15 in the following manner: when the contacts 137, 137 of the quarter switch are closed and the quarter solenoid 14 has its armature 103 in the fully attracted position, contacts 118, 119 of switch 109 are momentarily closed as described above. A circuit is therefore established from one side of the transformer 164 through lead 157, conductor 225, closed contacts 115, 116, closed contacts 118, 119, through conductors 222 and 204 to terminal 205 of a solenoid 15, through the solenoid 15 to terminal 206, and thence through conductors 207 and 208 to the other side of the line 158, which is connected to the other side of the transformer 164. Since contacts 118, 119 are normally immediately opened after the quarter passes through the coin chute and opens contacts 137, 138, no further energization of the add solenoid 15 will take place at this time.

Movement of the armature 103 of the quarter solenoid 14 also effects energization of the motor 12 in the following manner: as described above, when the armature 103 is moved to its attracted position, it engages with the button 111 of switch 109 and, on the initial impulse, when the armature 103 is moved to its fully attracted position, contacts 115, 116 are closed, contacts 117, 121 are opened and contacts 118 and 119 are closed. As soon as contacts 137, 138 of the quarter coin switch open, the quarter solenoid 14 is de-energized and the armature 103 moves a short distance away from its fully attracted position, but is stopped by the arm 122. When this occurs, contacts 115, 116 remain closed, contacts 117, 121 are closed and contacts 118, 119 are opened.

When the armature 103 is in the position where it is stopped by arm 122, which occurs when a quarter has normally passed through the quarter chute and momentarily closed contacts 137, 138, the motor 12 is energized by the following circuits: starting with line 157, which is connected to one side of transformer 164, the circuit includes conductor 225, closed contacts 115, 116, closed contacts 117, 121, conductor 232 to terminal 231 of the motor 12, through the motor and terminal 229 thereof, thence through conductor 208, back to line 158 which is connected to the other side of the transformer 164. As soon as the motor 12 starts to rotate, it rotates gear 19 and also rotates the cam 22. The projection 39 on switch arm 38 of switch 31 is thus moved out of the depression 25 on the cam 22 and rides on the high portion of the cam 24. This closes contacts 33, 37 and opens contacts 32, 35. While the contacts 32, 35 are open, no selections may be made even though master switch contacts 51, 51a are closed. This is because the circuit from one side of the line 157 is broken to lead 159 going through the selector circuit. After the cam 22 has rotated 180° the contacts 32, 35 are closed, and a circuit to the selector mechanism is established from line 157, which is connected to one side of the transformer 164, and one side of the selector circuit through conductors 225 and 209, closed contacts 32, 35, through conductor 211, closed contacts 51, 51a, conductor 212, closed contacts 60, 61 and conductor 159 to the other side of the transformer 164 through the selector circuit, when one of the push-buttons is operated.

Before the motor has quite completed a half-revolution of the cam 22, one of the pins 23 thereon engages the projection 126 on bell crank lever 122 and rotates arm 123 to the position where it no longer blocks armature 103 of solenoid 14. The armature 103, therefore, returns to its completely de-energized position shown in Figure 1 and contacts 115, 116 of switch 109 are opened. However, since contacts 33, 37 are still closed, the motor continues to be energized until switch arm 38 drops into depression 25 on cam 22 to open the contacts 33, 37 and thus de-energize the motor circuit.

One reason for the arrangement of the switch 109 is to prevent energization of the motor, adding of credits or making selections, if a quarter sticks and holds contacts 137, 138 closed. With contacts 137, 138 closed the armature 103 of solenoid 14 remains in its completely energized position with contacts 117, 121 open so that no circuit to motor 12 may be completed. In addition, add solenoid 15 remains energized and no credits may be added by any coin. Also contacts 60, 61 remain open and no selections may be made.

Also by having the contacts 33, 37 and 115, 116 and 121 in series with the motor, de-energization of the motor is insured even though one or the other set of contacts might not open at the proper time.

It is obvious that as the gear 19 rotates a half revolution, the four teeth 20 on one side thereof will rotate gears 26 and 28 for a distance equivalent to four teeth, thus establishing four credits. Master switch contacts 51, 51a have already been closed by the first credit, so that selections may be made. The gear 19 is arranged so it will always stop with the teeth 20 disengaged from the gear 26, so that credits may be established by a nickel or a dime and so that the cancel solenoid may subtract credits as selections are made.

From the foregoing it will be apparent that the sequence of operations when a quarter is used in the mechanism is that the first credit is added to the mechanism by operating the add solenoid 15, which also incidentally closes the master switch contacts 51, 51a. The contacts 60 and 61 of the add solenoid 15, however, prevent making a selection at the particular instant that the solenoid 15 is energized. Immediately thereafter the motor starts in operation and four more credits are added by the gear 19. However, since the contacts 32, 35 are open at this time no selections can be made, even though master switch contacts 51, 51a are closed, until the cam 22 rotates a sufficient distance to stop the motor and close contacts 32, 35. As selections are made, the cancel solenoid 16 is energized by each selection, as described above, to subtract one credit by rotation of the gears 26, 28.

*Description of Figures 6 to 10 inclusive, 14 and 15*

Referring now to Figures 6 to 10 inclusive, 14 and 15 for a description of the second embodiment of the invention, it is first to be noted that the mechanism and the circuits are substantially identical with the first embodiment of the invention with the exception that the ten cent solenoid operates the motor to establish two credits, instead of the solenoid itself twice opening and closing a switch.

Figure 8:
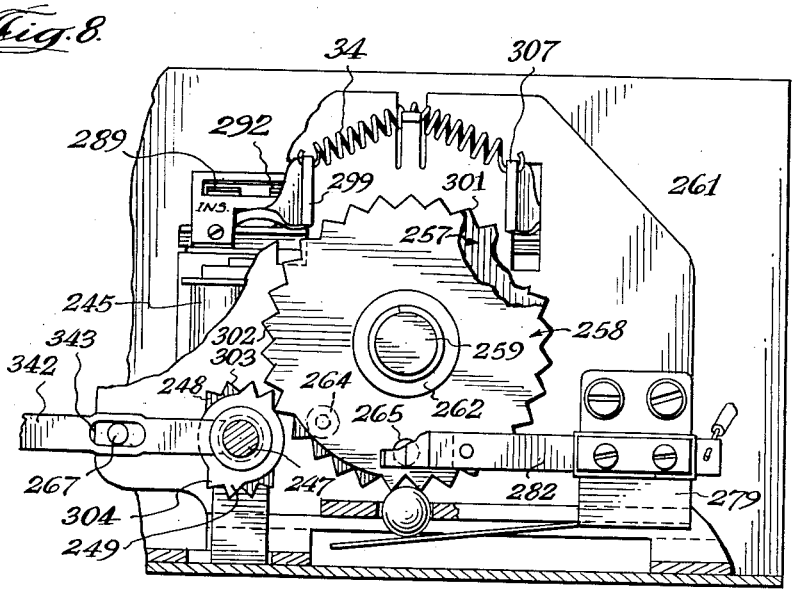
Figure 8 is a sectional view, with parts thereof broken away, taken on line 8—8 of Figure 6.
Figure 9:
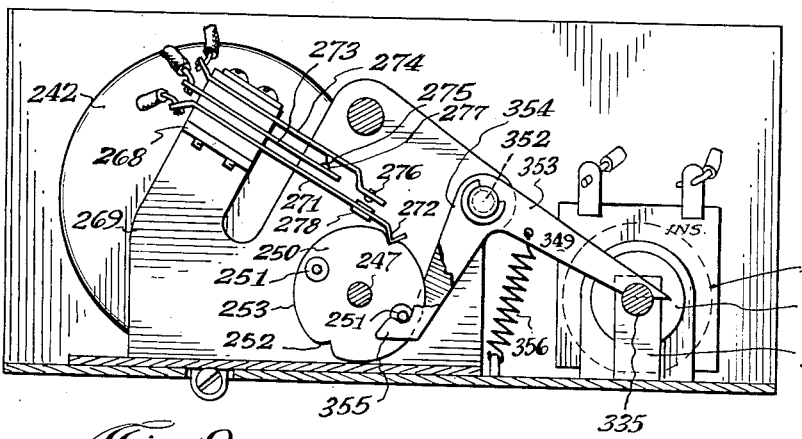
Figure 9 is a sectional view of the apparatus taken on line 9—9 of Figure 6.

Referring now to Figures 6, 8 and 9, the mechanism is mounted on a base plate 241 and includes a motor 242 attached thereto. A ten cent solenoid 243, a quarter solenoid 244 and an add solenoid 245, which is also the nickel solenoid, and a subtract solenoid 246 are also mounted on the base 241. The motor drives a shaft 247 through suitable gearing (not shown). Mounted on the shaft 247 in spaced relation are small gears 248 and 249, which will be described in detail hereinafter. Also mounted on the shaft 247 for rotation therewith is a cam member 250 having two sets of pins 251 extending therethrough and projecting outwardly on each side of the cam member 250. The cam member 250 is provided with two depressions 252 and two smooth circular portions 253.

A driving member 254 is slidably mounted on the shaft 247 and the shaft 147 provides a bearing for rotation of the member 254. The member 254 is connected by a collar 255 to the small gears 248 and 249, which likewise are connected together by suitable means and are rotatable on the shaft 247. A slot 255 is provided between the collar 254 and the gear 249 for a purpose hereinafter described. A cooperating driving member 256 is secured to the shaft 247 and rotates therewith. It has axial faces which are adapted to engage with axial faces of the member 254 so that the member 254 is rotated on the shaft 247 and member 256 is rotated by motor 242. The members 254 and 256 provide a driving connection between them, and permit the collar 254 to be shifted axially of the shaft 247, to a limited extent.

Two large gears 257 and 258 are mounted on a bearing 259, which bearing 259 is supported on a vertical plate 261 secured to the base 241. A collar 262 maintains the gears 257 and 258 in spaced relation and also fastens the two gears together so that they rotate simultaneously on the bearing 259. The gear 258 is positioned so that it will be rotated by the smaller gears 248 and 249 depending upon their position, as will be apparent as the description proceeds. A collar 263 maintains the gears 257 and 258 in properly spaced relation with respect to the supporting plate 261. A pin 264 projects from one side of the gear 257 facing the plate 261 and a button or projection 265 is disposed on the gear 258 on the side which faces the motor 242. The pin 264 and a bent tab 266 extending from plate 261 provide a stop for the rotation of the gears 257 and 258. A well known spring and ball detent are provided for maintaining the gears 257 and 258 in the position in which they are placed by the mechanism.

As best shown in Figure 8, a pin or rod 267 extends from the plate 261 towards the motor 242.

A motor switch 268 is mounted on a vertical plate 269 which is secured to the base 241. The motor switch 268, as best shown in Figures 9 and 10, includes a movable flexible switch arm 271 having a V-shaped end 272 thereon. The switch 268 also includes a relatively stiff flexible switch arm 273 and a second movable switch arm 274. Contacts 275 and 276 are provided on the movable switch arm 274 and are adapted to engage with contacts 277 and 278 on switch arms 273 and 271, respectively.

A selector circuit switch is shown at 279 and includes a relatively fixed flexible arm 281 and a movable flexible arm 282 having a V-shaped end member 285, which is adapted to be engaged by the button 265 on gear 258 at certain specified times. The arm 281 has a contact 283 thereon adapted to engage with a contact 284 on the switch arm 282.

The add or nickel solenoid 245 includes an armature 286 and has switches 287 and 288 adapted to be operated thereby. A switch 287 comprises a movable switch arm 289 and a relatively fixed switch arm 291. The switch 287 includes a movable switch arm 289 and a relatively fixed switch arm 291. The switch 288 includes a movable switch arm 292 and a relatively fixed switch arm 293. A contact 294 is provided on switch arm 289 and is adapted to engage with a contact 295 on switch arm 291. A contact 296 is provided on switch arm 292 and is adapted to engage with a contact 297 on switch arm 293. A rigid bar 298, which is bent to provide a vertically extending blade 299, is secured to the armature 286 of solenoid 245. The vertical blade 299 extends through a suitable aperture in the vertical plate 261 and is adapted to engage with teeth 301 on gear 257. Gear 258 is provided with teeth 302 with which teeth 303 or 304 of small gears 248 and 249, respectively, are adapted to engage during certain operations of the machine, which will be described hereinafter.

The subtract solenoid 246 operates armature 305. Secured to the armature 305 is a rigid member 306 having a vertical blade 307 bent therefrom which corresponds to the blade 299 of the member 298 operated by armature 286. The blade 307 extends through a suitable aperture in the plate 261 and is adapted to engage with the teeth 301 of gear 257 on an opposite side of the bearing 259 from the member 299.

It will be clear, therefore, that when the armature 286 is attracted, the blade 299 will rotate the gear 257 a distance equivalent to one notch 301 in one direction to add credits and, as the armature 305 is attracted, the blade 307 will engage teeth of gear 257 to rotate in the opposite direction and subtract credits. The gears 257 and 258 rotate together as stated above.

A switch 308 is operated by the armature 305 of subtract solenoid 246 and comprises a movable switch arm 309 and a relatively fixed switch arm 311. A contact 312 is provided on the switch arm 309 and is adapted to engage with a contact 313 on switch arm 311.

A ten cent solenoid switch 314 is adapted to be operated by the solenoid 243 and comprises a relatively fixed flexible switch arm 315, a relatively fixed flexible switch arm 316 and a movable flexible switch arm 317. The switch arm 315 is provided with two contacts 318 and 319 adapted to engage with contacts 321 and 322 which are provided on arms 316 and 317, respectively. A button 320 is provided on the end of the switch arm 317.

A twenty-five cent solenoid switch is provided at 323 and is adapted to be operated by the solenoid 244. The switch 323 comprises flexible switch arms 324, 325, 326 and 327. A button 328 is provided on the end of the switch arm 324. Switch arm 324 is also provided with a contact 329 which is adapted to engage with a contact 331 on switch arm 326. A contact 333 is provided on switch arm 325 and is adapted to engage with a contact 332 on switch arm 326. A contact 330 on switch arm 326 is adapted to engage with a contact 334 on switch arm 327.

Referring again to the ten cent solenoid 243, it is provided with an armature 335 which extends outwardly a short distance from one end thereof as shown at 336. A spring 337, which is disposed between a washer 338 and a ring 339, surrounds the armature 335 and tends to maintain the armature in its unattracted position, as shown in Figure 6.

A stop extending upwardly from the plate 241 is shown at 341 and in the inactive position of the apparatus, the spring 337 forces the end of the armature 335 against the stop 341. It is to be noted that all of the parts and the switches are shown in their normally inactive position in all of the figures.

A rigid arm 342 is secured to the washer 338 and has one end thereof extending into the slot 255 formed between the gear 249 and the slidable collar 254. The arm 342 is provided with an aperture 343, through which the rod or pin 267 extends, so as to guide the arm 342 in its movement. It will be apparent that as the washer 338 is moved by armature 335 of solenoid 243, the collar 254 and gears 248 and 249 will be shifted. When the armature 335 is in its inactive position, the gear 248, which has two sets of four teeth 303 thereon, with smooth portions therebetween, will be in alignment with the gear 258. When the armature 335 is in its attracted or latched position, the gear 249 having two sets of two teeth thereon, with smooth spaces therebetween, will be aligned with gear 258. The method of latching the armature 335 will be described hereinafter.

The quarter solenoid 244 has an armature 344 associated therewith projecting a considerable distance from one end thereof and slightly from the other end thereof, as shown at 345. A spring 346 tends to maintain the armature in its unattracted position and is disposed between a washer 347 and a washer 348. The end of the armature 344 is, therefore, normally held in engagement with the stop 341, which also provides a stop for armature 335.

Two bell crank levers 349 and 351 are pivoted upon a shaft 352 extending from the plate 269. The bell crank levers 349 and 351 are maintained in spaced relation by a collar 353. The bell crank levers 349 and 351 are independently rotatable about the pivot or shaft 352. Only one bell crank lever 349 is shown in detail in Figure 9, since both of the bell crank levers are identical in shape and function. The bell crank lever 349 includes one arm 353 which extends in such a position that it rests on the top of armature 335, but when armature 335 is attracted, a spring 356 rotates the arm 349 to a position where it prevents the return of armature 335 to its unattracted position when solenoid 243 is de-energized. The bell crank lever 349 also includes an arm 354 having a latching projection 355 thereon, which is adapted to be engaged by the pins 251 on cam 250 at certain points in the rotation of said cam. The purpose of the latch mechanisms will become apparent as the description proceeds.

Referring now to Figures 7 and 10, for a description of the coin chutes and switches, it will be noted that these are identical with the chutes and switches described with respect to the first embodiment of the invention. The nickel coin chute is shown at 357 and a nickel is adapted to operate a switch 358 having a movable switch arm 359 and a fixed switch arm 361. The coin is adapted to engage a projection 362 on switch arm 359 which extends into the chute 357. When the projection 362 is moved, a contact 363 on arm 359 is adapted to engage with a contact 364 on switch arm 361.

The ten cent coin chute is shown at 365 and a dime is adapted to operate a switch 366 having a movable switch arm 367 and a relatively fixed switch arm 368. The switch arm 367 is provided with a projection 369 which extends into the coin chute 365 and is adapted to be moved by the passage of a coin. The switch arm 367 has a contact 371 which is adapted to engage with a contact 372 on switch arm 368 when projection 369 is moved by a coin.

The twenty-five cent coin chute is shown at 373 and a quarter is adapted to operate a switch 374 having a movable switch arm 375 and a relatively fixed switch arm 376. The movable switch arm 375 has a projection thereon extending into the coin chute 373 and adapted to be moved by the passage of a coin therethrough. A contact 378 is provided on the switch arm 375 and is adapted to engage with a contact 379 when projection 377 is moved by a coin.

*Operation of Figures 6 to 10 inclusive, 14 and 15*

In describing the operation of the second embodiment of the invention, it is first to be noted that the operation of the mechanism when a nickel or a quarter is used is exactly the same as described with respect to the first embodiment of the invention and the diagrams shown in Figures 11 and 12 may be referred to for clarity. However, new numerals have been given to the complete wiring diagram of Figure 10 and the description will be made following those numerals. Furthermore, the selector circuit shown in Figure 15 is exactly the same regardless of which of the embodiments is utilized. As shown in Figures 10 and 14, therefore, the source of power has been marked "S" and the leads therefrom have been given numerals 157 and 158. Likewise, the leads from the selector circuit to the remainder of the circuit shown in Figure 10 have been given numerals 159 and 161. In view of the above it is believed that it will be unnecessary to again describe in detail the operation of the selector circuit shown in Figure 15, as to its relationship with the wiring diagram of Figure 10.

If a nickel is inserted in the coin chute 357, the following operations take place and the following circuits are established. Power is supplied through lead 158, through conductor 381, through closed contact 363, 364 of the nickel switch 358, through conductors 382 and 383 to terminal 384 of the nickel solenoid 245, through the solenoid 245 to terminal 385 thereon, thence through conductors 386 and 387 back to lead 157.

Energization of the solenoid 245 attracts armature 286 and moves gear 257 a distance equivalent to one notch thereof. Gear 258 also moves. The small gears 248 and 249 always come to rest in a position where the smooth portions thereof face the gear 258 and do not obstruct the rotation of gears 258 or 257.

When the add solenoid 245 is energized, contacts 294, 295 and 296, 297 momentarily open. Opening of contacts 294, 295 prevent any selection being made while the nickel solenoid 245 operates. Opening of contacts 296, 297 prevents operation of the motor 242 while the add solenoid 245 is energized.

As soon as the gear 258 is rotated, the button 265 is moved and switch arm 282 is depressed and closes contacts 283, 284. This establishes the selector circuit in the following manner: from lead 158, through conductors 381, 391, 392, 393, through normally closed contacts 275, 277, conductor 411, normally closed contacts 294, 295, conductors 395, 396, through closed contacts 283, 284, through conductors 397 and 398 to lead 159 and, thence back to the other side of the line 157, when a selector button is pushed.

It will be apparent that as many nickels may be inserted in the machine up to its capacity, which is determined by a number of teeth on the gear 257. The stop members 264 and 266 will prevent the making of more selections than there are teeth. Also if a nickel sticks on the nickel coin switch and maintains the contacts 363 and 364 closed, the add solenoid 245 will remain energized, but no selections may be made and motor 242 may not be energized because contacts 294, 295 and 296, 297 which are operated by the nickel solenoid 245, remain open.

Credits are cancelled by energization of the cancel solenoid 246 in exactly the same manner as set forth with respect to the first embodiment of the invention. Power is supplied to the cancel solenoid from lead 157, to terminal 388, through the cancel solenoid 246, thence through lead 161 and back to the other side of the transformer 164 when a selection is made by pushing one of the selector buttons. The closing of contacts 312, 313, insures that the last credit is usable on the last cancel step.

If a dime is inserted in the dime chute 365, the following operations and circuits are established. Power is supplied from lead 158, through conductors 381, closed contacts 371, 372 of the dime switch 366, conductor 399 to terminal 401 of the dime solenoid 243, through terminal 402, conductors 403 and 378 back to lead 157. The dime solenoid 243 is, therefore, energized and the armature 335 thereof is moved to its fully attracted postion. When this occurs, contacts 319 and 322 associated with the dime solenoid are closed and contacts 318, 321 are momentarily opened. If a coin does not stick, solenoid 243 is almost immediately deenergized, but in the meantime bell crank lever 349 has been rotated by spring 356, so that arm 343 thereof will block the return of the armature 335 to its fully unattracted position. In this position both contacts 319, 322 and 318, 321 will remain closed.

At the same time that the armature 335 is shifted to its latched position, arm 342 will slide collar 254 and gears 248 and 249 on the main motor shaft 247, so that gear 249 which has two sets of two teeth 304 thereon will be aligned with gear 258.

The following circuit is then set up to energize motor 242; from line 157, through conductors 387, 403, 409 and 408 to terminal 407 of the motor 242, through the motor 242, through terminal 406 thereof, conductor 405, normally closed contacts 296, 297 on the add solenoid, through conductors 404 and 400, through closed contacts 318, 321 and closed contacts 319, 322, through conductors 317, 391 and 381 back to line 158. This will start rotation of the motor, which in turn rotates the cam 250 and the gear 249. As the gear 249 rotates, only two credits will be added since the gear 258 will be moved the equivalent of the space of two teeth by the two teeth 304 on gear 249. The motor will stop when it has rotated the gear 249 one half revolution, whereupon it comes to rest again with a flat portion thereof facing gear 258. As soon as the gear 258 is rotated the selector switch contacts 283, 284 close and the circuit is in condition for making selections as described above with respect to the five cent solenoid operation.

However, as the cam 250 rotates and raises arm 271, contacts 276, 278 of the motor switch are closed and contacts 275, 277 are open. While contacts 275, 277 are open, no selections may be made since these contacts are in series with contacts 283, 284 of the selector switch associated with gear 258. As described with respect to the operation of the nickel solenoid, contacts 275, 277 form a part of the selector circuit and if they are open no selections may be made.

As the motor rotates the cam 250, one of the pins 251 strikes the latching projection 355 of bell crank lever 349 and rotates it about its pivot 352, so that the spring 337 will return armature 335 of the dime solenoid 243 to its fully unattracted position against the stop 341. This will open contacts 319 and 322, contacts 318, 321 remaining closed. However the motor will not stop because contacts 276, 278 are in series with contacts 319, 322 and the following circuit will be maintained to operate the motor until the switch arm 271 drops into one of the notches 252 on cam 250 to open contacts 276, 278. From line 157, through conductors 387, 403, 409 and 408 to terminal 407, through motor 242 to terminal 406, through conductor 405, normally closed contacts 296, 297, conductors 404, 414 and 415, through closed contacts 276, 278, through conductors 393, 392, 391 and 381 back to line 158.

Cancellation of credits takes place in the same manner as described above.

If a dime sticks on the dime switch and maintains contacts 371, 372 closed, solenoid 243 maintains armature 335 in its fully attracted position with the result that contacts 318, 321 remain open. Since it is necessary that contacts 318, 321 be closed to complete the circuit for starting the motor it is obvious that the motor will not operate if a dime sticks and maintains contacts 371, 372 closed.

When the armature 335 is returned to its fully unattracted position in the normal operation of the machine, the collar 254 and gears 248, 249 will again be shifted to the position shown in Figure 10, with the smooth part of gear 248 facing gear 258.

If a quarter is inserted in the quarter chute 373 the following operations and circuits take place; it again being pointed out that the operations and circuits are substantially identical with that described with respect to the first embodiment of the invention. A circuit is established to energize the twenty-five cent solenoid 244 starting from line 158, through conductor 381, closed contacts 378, 379, conductor 412 to terminal 413, through solenoid 244 to terminal 410, through conductors 409, 403 and 387 to the other side of the line 157. Solenoid 244 is, therefore, energized and armature 344 is moved to its fully attracted position. Bell crank lever 351 will be moved to block return of the armature 344, in the same manner as described with respect to the ten cent solenoid 243.

When the twenty-five cent solenoid is energized and the armature 344 thereof is in the fully attracted position, contacts 329, 331 and contacts 330, 334 are closed and contacts 332, 333 are open. Closing of contacts 330, 334 energize the nickel or add solenoid 245 to add one credit by operating the armature thereof and rotating gear 257. The add solenoid 245 is energized in the following manner: from line 157, through conductor 387 and 386 to terminal 385, through add solenoid 245 to terminal 384, through conductors 383, 420, through closed contacts 330, 334, closed contacts 329, 331 and conductors 324, 392, 391 and 381 to the other side of line 158.

As soon as the quarter has passed through the chute 373 and opened contacts 378, 379, solenoid 244 is de-energized, but armature 344 is blocked by bell crank lever 351. When this occurs, contacts 329, 331 and contacts 332, 333 are closed and contacts 330, 334 are open. The following circuits are, therefore, established to energize motor 242. From line 157, through conductors 387, 403, 409 and 408, to terminal 407 of the motor, through the motor 242 to terminal 406, through conductor 405, through closed contacts 296, 297, through conductors 404 and 414, through closed contacts 332, 333 and 329, 331, through conductors 392, 391 and 381 back to line 158.

As the motor continues to rotate, four credits will be added by gear 248, since it will move gear 258 the distance equivalent to four teeth. Therefore, a total of five credits is credited by the mechanism when a quarter is inserted. The gear 248 will stop when it has completed one-half revolution and a smooth surface thereof will be facing but not obstructing movement of gears 258.

As described with respect to the operation of the mechanism when a dime is inserted, no selections may be made while the motor is rotating because contacts 275, 277 are open. Furthermore, as the motor rotates cam 250, one of the pins 251 will first unlatch the armature 344 so that spring 346 will again force it against stop 341. This will open contacts 329 and 331, but the motor will continue to rotate because contacts 329, 331 are in parallel with the motor switch contacts 276, 278, which are still closed and remain closed until switch arm 271 drops into one of the depressions 252 in cam 250. This again insures that if one or the other of these sets of contacts do not open for some reason the motor will not continue to rotate and add credits.

The selector switch and cancel switch operate in the same manner as described above with respect to the other coins.

If a quarter sticks and contacts 378, 379 remain closed, the motor cannot start operating because the quarter solenoid 244 will remain in its fully attracted position with contacts 332, 333 open. These contacts must be closed to establish a circuit to start the motor when a quarter is used. Furthermore, the add solenoid 245 will remain energized and contacts 294, 295 and 296, 297 will remain open. Therefore, it is additionally impossible to make selections and furthermore, no credits will be given by either inserting a nickel or a dime, since the nickel solenoid 245 will not re-operate and because contacts 294, 295 must be closed for the motor 242 to operate by the insertion of a dime or a quarter.

It is possible of course to provide some kind of an audible or visual signal if a coin sticks on any one of the coin switches. However, from the foregoing description it is clear that if a nickel or a quarter sticks on its coin switch, no further operation of the device is possible. The mechanism and circiuts, therefore, adequately prevent jackpotting. In other words, it is impossible to continue to obtain credits or make selections if a nickel or a quarter sticks or if the contacts of the nickel or the quarter switches or the quivalent thereof remain closed for any reason.

The purpose of the arrangement of the gears 19 in the first embodiment and 248 and 249 in the second embodiment is to obtain gears which are as small as possible to provide maximum torque and still have the gears operate only one-half a revolution per cycle. The purpose of providing four teeth on the gears 19 and 248 is to obtain the above advantages. When holding small diameters it is possible to place two sets of four teeth on the gear but not two sets of five teeth. Therefore, the add or nickel solenoid is utilized to place one credit on the machine when a quarter is inserted.

From the foregoing it will be apparent that we have provided improved accumulator devices and circuits which prevent jackpotting, are very fast in adding and subtracting credits and which are extremely accurate.

Although we have herein shown and described a preferred embodiment of our invention, manifestly it is capable of modification and rearrangement of parts without departing from the spirit and scope thereof. We do not, therefore, wish to be understood as limiting this invention to the precise embodiment herein disclosed, except as it may be so limited by the appended claims.

We claim:

1. Accumulator apparatus comprising credit storing means, a source of power, a first switch, means for operating said credit storing means to add one credit thereto when said first switch is closed, a second switch, a motor, means providing a driving connection between said motor and the credit storing means, a circuit starting the motor when said second switch is closed, a motor switch connected between the source of power and the motor for stopping the motor when it has operated the credit storing means to add a predetermined number of credits of a greater number than one, means for cancelling credits from said credit storing means, a third switch and means for closing the third switch when any credits are stored in the credit storing means and for opening the third switch when no credits are stored therein.

2. Accumulator apparatus comprising credit storing means, a source of power, a first switch, means for operating said credit storing means to add one credit thereto when said first switch is closed, a second switch, a motor, means providing a driving connection between said motor and the credit storing means, a circuit starting the motor when said second switch is closed, a motor switch connected between the source of power and the motor for stopping the motor when it has operated the credit storing means to add a predetermined number of credits of a greater number than one, means for cancelling credits from said credit storing means, a third switch, means for closing the third switch when any credits are stored in the credit storing means and for opening the third switch when no credits are stored therein, a fourth switch and means for opening said fourth switch while said motor is energized.

3. Accumulator apparatus comprising credit storing means, a source of power, a first switch, means for operating said credit storing means to add one credit thereto when said first switch is closed, a second switch, a motor, means providing a driving connection between said motor and the credit storing means, a circuit starting the motor when said second switch is closed, a motor switch connected between the source of power and the motor for stopping the motor when it has operated the credit storing means to add a predetermined number of credits of a greater number than one, means for cancelling credits from said credit storing means, a third switch, means for closing the third switch when any credits are stored in the credit storing means and for opening the third switch when no credits are stored therein, a fifth switch, and means for opening said fifth switch while said operating means for adding one credit is active.

4. Accumulator apparatus comprising credit storing means, a source of power, a first switch, means for operating said credit storing means to add one credit thereto when said first switch is closed, a second switch, a motor, means providing a driving connection between said motor and the credit storing means, a circuit starting the motor when said second switch is closed, a motor switch connected between the source of power and the motor for stopping the motor when it has operated the credit storing means to add a predetermined number of credits of a greater number than one, means for cancelling credits from said credit storing means, a third switch, means for closing the third switch when any credits are stored in the credit storing means and for opening the third switch when no credits are stored therein, a fourth switch, a fifth switch, means for opening the fourth switch while the motor is operating the credit storing means and means for opening the fifth switch while said operating means for adding one credit is operating said credit storing means, said fourth and fifth switches being connected in series with said source of power.

5. Accumulator apparatus comprising credit storing means, a source of power, a first switch, means for operating said credit storing means to add a predetermined number of credits thereto when said first switch is closed, a second switch, an electrical motor, means providing a driving connection between said motor and the credit storing means, a circuit for starting the motor which is rendered effective by closure of said second switch, a motor switch connected between the motor and the source of power for stopping the motor when it has operated the credit storing means to add a predetermined number of credits of a predetermined multiple of the number of credits added when said first switch is closed, means for cancelling credits from said credit storing means, a third switch connected to said source of power and means for closing said third switch when any credits are stored in the credit storing means and opening said third switch when no credits are stored therein.

6. Accumulator apparatus comprising credit storing means, a source of power, a first switch, electro-magnetic means including a coil and armature for operating said credit storing means to add a predetermined number of credits thereto when said first switch is closed, a second switch, an electric motor, means providing a driving connection between said motor and the credit storing means, a circuit including a second electro-magnetic means for starting the motor which is rendered effective by closure of said second switch, means for stopping the motor when it has operated the credit storing means to add a predetermined number of credits of a predetermined multiple of the number of credits added when said first switch is closed, means for cancelling credits from said credit storing means, a third switch connected to said source of power and means for closing said third switch when any credits are stored in the credit storing means and for opening the third switch when no credits are stored therein.

7. Accumulator apparatus comprising credit storing means, a source of power, a first switch, electro-magnetic means including a coil and armature for operating said credit storing means to add a predetermined number of credits thereto when said first switch is closed, a second switch, an electric motor, means providing a driving connection between said motor and the credit storing means, a circuit including a second electromagnetic means for starting the motor which is rendered effective by closure of said second switch, means for stopping the motor when it has operated the credit storing means to add a predetermined number of credits of a predetermined multiple of the number of credits added when said first switch is closed, means for cancelling credits from said credit storing means, a third switch connected to said source of power, means for closing said third switch when any credits are stored in the credit storing means and for opening the third switch when no credits are stored therein, a fourth switch connected to said source of power and means for opening said fourth switch while the motor is operating the credit storing means.

8. Accumulator apparatus comprising credit storing means, a source of power, a first switch, means for operating said credit storing means to add a predetermined number of credits thereto when said first switch is closed, a second switch, an electrical motor, means providing a driving connection between said motor and the credit storing means, a circuit for starting the motor when said second switch is closed, a second circuit for continuing operation of the motor, a pair of motor switches connected between the motor and the source of power in parallel for stopping the motor by de-energization of said second circuit when the motor has operated the credit storing means to add a predetermined number of credits of a predetermined multiple of the number of credits added when said first switch is closed, means for cancelling credits from said credit storing means, a third switch, and means for closing said third switch when any credits are stored in the credit storing means and for opening the third switch when no credits are stored therein.

9. Accumulator apparatus comprising credit storing means, a source of power, a first switch, means for operating said credit storing means to add a predetermined number of credits thereto when said first switch is closed, a second switch, an electrical motor, means providing a driving connection between said motor and the credit storing means, a circuit for starting the motor when said second switch is closed, a second circuit for continuing operation of the motor, a pair of motor switches connected between the motor and a source of power in parallel for stopping the motor by de-energization of said second circuit when the motor has operated the credit storing means to add a predetermined number of credits of a predetermined multiple of the number of credits added when said first switch is closed, means for cancelling credits from said credit storing means, a third switch, means for closing the third switch when any credits are stored in the credit storing means and for opening the third switch when no credits are stored therein, a mechanical means for opening and closing at least one of said parallel motor switches and means for operating said independent mechanical means in response to closing of said second switch.

10. Accumulator apparatus comprising credit storing means, a source of power, a first switch, means for operating said credit storing means to add a predetermined number of credits thereto when said first switch is closed, a second switch, an electrical motor, means providing a driving connection between said motor and the credit storing means, a circuit for starting the motor when said second switch is closed, a second circuit for continuing operation of the motor, a pair of motor switches connected between the motor and a source of power in parallel for stopping the motor by de-energization of said second circuit when the motor has operated the credit storing means to add a predetermined number of credits of a predetermined multiple of the number of credits added when said first switch is closed, means for cancelling credits from said credit storing means, a third switch, means for closing the third switch when any credits are stored in the credit storing means and for opening the third switch when no credits are stored therein, and mechanical means for opening and closing said parallel motor switches, said mechanical means being operated in response to operation of said motor.

11. Accumulator apparatus comprising credit storing means, a source of power, a first switch, means for operating said credit storing means to add a predetermined number of credits thereto when said first switch is closed, a second switch, an electrical motor, means providing a driving connection between said motor and the credit storing means, a circuit for starting the motor when said second switch is closed, a second circuit for continuing operation of the motor, a pair of motor switches connected between the motor and a source of power in parallel for stopping the motor by de-energization of said second circuit when the motor has operated the credit storing means to add a predetermined number of credits of a predetermined multiple of the number of credits added when said first switch is closed, means for cancelling credits from said credit storing means, a third switch, means for closing the third switch when any credits are stored in the credit storing means and for opening the third switch when no credits are stored therein, and mechanical means for opening and closing said parallel motor switches, said mechanical means being operated in predetermined sequence in response to operation of said motor.

12. Accumulator apparatus comprising credit storing means, a source of power, a first switch, means for operating said credit storing means to add a predetermined number of credits thereto when said first switch is closed, a second switch, an electrical motor, means providing a driving connection between said motor and the credit storing means, a first circuit for energizing said credit storing operating means to add said predetermined number of credits thereto when the second switch is closed, a second circuit for starting the motor when said second switch is closed, a motor switch connected between the motor and the source of power for stopping the motor when it has operated the credit storing means to add a predetermined number of credits of a predetermined multiple of the number of credits added when said first switch is closed, means for cancelling credits from said credit storing means, a third switch, and means for closing the third switch when any credits are stored in the credit storing means and for opening the third switch when no credits are stored therein.

13. Accumulator apparatus comprising credit storing means, a source of power, a first switch, electro-magnetic means including a coil and armature for operating said credit storing means to add a predetermined number of credits thereto when said first switch is closed, a second switch, an electric motor, means providing a driving connection between said motor and the credit storing means, a first circuit for operating said electro-magnetic means when the second switch is closed to add said predetermined number of credits to the credit storing means, a second circuit including means for energizing the same for starting the motor after the second switch is opened and the electro-magnetic means has operated, means for stopping the motor when it has operated the credit storing means to add a predetermined number of credits of a predetermined multiple of the number of credits added when said first switch is closed, means for cancelling credits from said credit storing means, a third switch and means for closing the third switch when any credits are stored in the credit storing means and for opening the third switch when no credits are stored therein.

14. Accumulator apparatus comprising credit storing means, a source of power, a first switch, means for operating said credit storing means to add a predetermined number of credits thereto when said first switch is closed, a second switch, means for adding a predetermined number of credits to the credit storing means which is a predetermined multiple of the number of credits added when the first switch is closed upon closure of the second switch, a third switch, an electrical motor, means providing a driving connection between said motor and the credit storing means, a first circuit for starting the motor which is rendered effective by closure of said third switch, a motor switch connected between the motor and the source of power for stopping the motor when it has operated the credit storing means to add a predetermined multiple of the number of credits added when said second switch is closed, means for cancelling credits from said credit storing means, a fourth switch and means for closing the fourth switch when any credits are stored in the credit storing means and for opening the fourth switch when no credits are stored therein.

15. Accumulator apparatus comprising credit storing means, a source of power, a first switch, a first solenoid for operating said credit storing means to add a predetermined number of credits thereto when said first switch is closed, a second switch, means for adding a predetermined number of credits to the credit storing means which is a predetermined multiple of the number of credits added when the first switch is closed upon closure of the second switch, a third switch, an electrical motor, means providing a driving connection between said motor and the credit storing means, a first circuit for starting the motor which is rendered effective by closure of said third switch, a motor switch connected between the motor and the source of power for stopping the motor when it has operated the credit storing means to add a predetermined multiple of the number of credits added when said second switch is closed, means for cancelling credits from said credit storing means, a fourth switch, means for closing the fourth switch when any credits are stored in the credit storing means and for opening the fourth switch when no credits are stored therein, said means operated by the second switch including a second solenoid and a fifth switch opened and closed thereby to energize said first switch more than once.

16. Accumulator apparatus comprising credit storing means, a source of power, a first switch, means for operating said credit storing means to add a predetermined number of credits thereto when said first switch is closed, a second switch, a third switch, an electrical motor, means providing a driving connection between said motor and the credit storing means, a first circuit for starting the motor which is rendered effective by closure of the second switch to add a predetermined number of credits to said credit storing means which is a multiple of the number of credits added when said first switch is closed, a circuit for starting the motor which is rendered effective by closure of said third switch to add a predetermined number of credits to the credit storing means which is a multiple of the number of credits added by closure of said second switch, a motor switch connected between the motor and the source of power for stopping the motor when it has rotated a predetermined distance, means for cancelling credits from said credit storing means, a fourth switch and means for closing the fourth switch when any credits are stored in the credit storing means and for opening the fourth switch when no credits are stored therein.

17. Accumulator apparatus comprising a credit storing means, a source of power, a first switch, means including a coil and an armature operated thereby for operating said credit storing means to add a predetermined number of credits thereto when said first switch is closed, a second switch, means controlled by said second switch including a second coil and an armature operated thereby for operating said credit storing means to add a predetermined number of credits thereto which is a multiple of the number of credits added when the first switch is closed, a third switch, means controlled by said third switch for operating said credit storing means to add a predetermined number of credits thereto which is a multiple of the number of credits added when said second switch is closed, means for cancelling credits from said credit storing means, a fourth switch, means for closing the fourth switch when any credits are stored in the credit storing means and for opening the fourth switch when no credits are stored therein, an electric motor and means operated by said last second coil and armature for starting operation of said motor to add said predetermined number of credits which is a multiple of the number of credits added when the first switch is closed.

18. Accumulator apparatus comprising a credit storing means, a source of power, a first switch, means including a first coil and an armature operated thereby for operating said credit storing means to add a predetermined number of credits thereto when said first switch is closed, a second switch, means controlled by said second switch including a second coil and an armature operated thereby for operating said credit storing means to add a predetermined number of credits thereto which is a multiple of the number of credits added when the first switch is closed, a third switch, means controlled by said third switch for operating said credit storing means to add a predetermined number of credits thereto which is a multiple of the number of credits added when said second switch is closed, means for cancelling credits from said credit storing means, a fourth switch, means for closing the fourth switch when any credits are stored in the credit storing means and for opening the fourth switch when no credits are stored therein, an electric motor, means providing a driving connection between said motor and the credit storing means, a circuit for starting the motor which is rendered effective by closure of the second switch for adding said predetermined number of credits which is a multiple of the number of credits added when the first switch is closed, a circuit for starting the motor which is rendered effective by closure of said third switch to add said predetermined number of credits which is a multiple of the number of credits added when the second switch is closed, a motor switch connected between the motor and the source of power for stopping the motor when it has operated the credit storing means a predetermined distance, means for cancelling credits from said credit storing means, a fourth switch, and means for closing the fourth switch when any credits are stored in the credit storing means and for opening the fourth switch when no credits are stored therein.

19. Accumulator apparatus comprising credit storing means, a source of power, a first switch, means for operating said credit storing means to add a predetermined number of credits thereto when said first switch is closed, a second switch, a third switch, an electrical motor, means providing a slidable driving connection between said motor and the credit storing means, said driving connection including a driving means and a driven means, and also including a pair of gears on said driven means, a gear associated with said credit storing means adapted to be driven by one or the other of said pair of gears, a third switch, a circuit for starting the motor which is rendered effective by closure of either said second or third switch, one of said gears on said driven means having a predetermined number of teeth and the other of said gears having a predetermined greater number of teeth, one of said gears being normally positioned to engage the gear of the gear on the credit storing means when said motor is operated, means for shifting the other gear into a position where it will engage said gear on the credit storing means when one of said last two mentioned switches is closed, a motor switch connected between the motor and said source of power for stopping the motor when it has operated a predetermined distance, means for cancelling credits from said credit storing means, a fourth switch, and means for closing the fourth switch when any credits are stored in the credit storing means and for opening the fourth switch when no credits are stored therein.

20. Accumulator apparatus comprising credit storing means, a source of power, a first switch, means for operating said credit storing means to add a predetermined number of credits thereto when said first switch is closed, a second switch, a third switch, an electrical motor, means providing a slidable driving connection between said motor and the credit storing means, said driving connection including a driving means and a driven means, and also including a pair of gears on said driven means, a gear associated with said credit storing means adapted to be driven by one or the other of said pair of gears, a third switch, a circuit for starting the motor which is rendered effective by closure of either said second or third switch, one of said gears on said driven means having a predetermined number of teeth and the other of said gears having a predetermined greater number of teeth, one of said gears being normally positioned to engage the gear of the gear on the credit storing means when said motor is operated, means for shifting the other gear into a position where it will engage said gear on the credit storing means when one of said last two mentioned switches is closed, a motor switch connected between the motor and said source of power for stopping the motor when it has operated a predetermined distance, means for cancelling credits from said credit storing means, a fourth switch, means for closing the fourth switch when any credits are stored in the credit storing means and for opening the fourth switch when no credits are stored therein, said pair of gears both having flat portions between sets of teeth.

21. Accumulator apparatus comprising credit storing means, a source of power, a first switch, means for operating said credit storing means to add a predetermined number of credits thereto when said first switch is closed, a second switch, a third switch, an electrical motor, means providing a slidable driving connection between said motor and the credit storing means, said driving connection including a driving means and a driven means, and also including a pair of gears on said driven means, a gear associated with said credit storing means adapted to be driven by one or the other of said pair of gears, a third switch, a circuit for starting the motor which is rendered effective by closure of either said second or third switch, one of said gears on said driven means having a predetermined number of teeth and the other of said gears having a predetermined greater number of teeth, one of said gears being normally positioned to engage the gear of the gear on the credit storing means when said motor is operated, means for shifting the other gear into a position where it will engage said gear on the credit storing means when one of said last two mentioned switches is closed, a motor switch connected between the motor and said source of power for stopping the motor when it has operated a predetermined distance, means for cancelling credits from said credit storing means, a fourth switch, and means for closing the fourth switch when any credits are stored in the credit storing means and for opening the fourth switch when no credits are stored therein, one of said pair of gears having two sets of two teeth with flat portions therebetween and the other of said pair of gears having two sets of four teeth with flat portions therebetween.

22. Accumulator apparatus comprising credit storing means, a source of power, a first switch, means for operating said credit storing means to add a predetermined number of credits thereto when said first switch is closed, a second switch, a third switch, an electric motor, means providing a slidable driving connection between said motor and the credit storing means, said driving connection including a driving means and a driven means, and also including a pair of gears on said driven means, a gear associated with said credit storing means adapted to be driven by one or the other of said pair of gears, a third switch, a circuit for starting the motor which is rendered effective by closure of either said second or third switch, one of said gears on said driven means having a predetermined number of teeth and the other of said gears having a predetermined greater number of teeth, one of said gears being normally positioned to engage the gear of the gear on the credit storing means when said motor is operated, means for shifting the other gear into a position where it will engage said gear on the credit storing means when one of said last two mentioned switches is closed, a motor switch connected between the motor and said source of power for stopping the motor when it has operated a predetermined distance, a latch for retaining said other gear in shifted position, means for releasing the latch when the motor has rotated said predetermined distance, means for cancelling credits from said credit storing means, a fourth switch, and means for closing the fourth switch when any credits are stored in the credit storing means and for opening the fourth switch when no credits are stored therein.

MARVIN G. NELSEN.
THEDORE J. OBSZARNY.

REFERENCES CITED

The following references are of record in the file of this patent:

UNITED STATES PATENTS

| Number | Name | Date |
|---|---|---|
| 1,635,451 | Zsoldo | July 12, 1927 |
| 2,083,947 | Furber | June 15, 1937 |
| 2,122,550 | Adrian | July 5, 1938 |
| 2,230,486 | Durant | Feb. 4, 1941 |
| 2,265,124 | Andres | Dec. 9, 1941 |
| 2,325,536 | Osborne | July 27, 1943 |
| 2,368,874 | Poole | Feb. 6, 1945 |